O. S. PULLIAM.
STEERING GEAR ATTACHMENT.
APPLICATION FILED APR. 5, 1919.
1,328,762.
Patented Jan. 20, 1920.
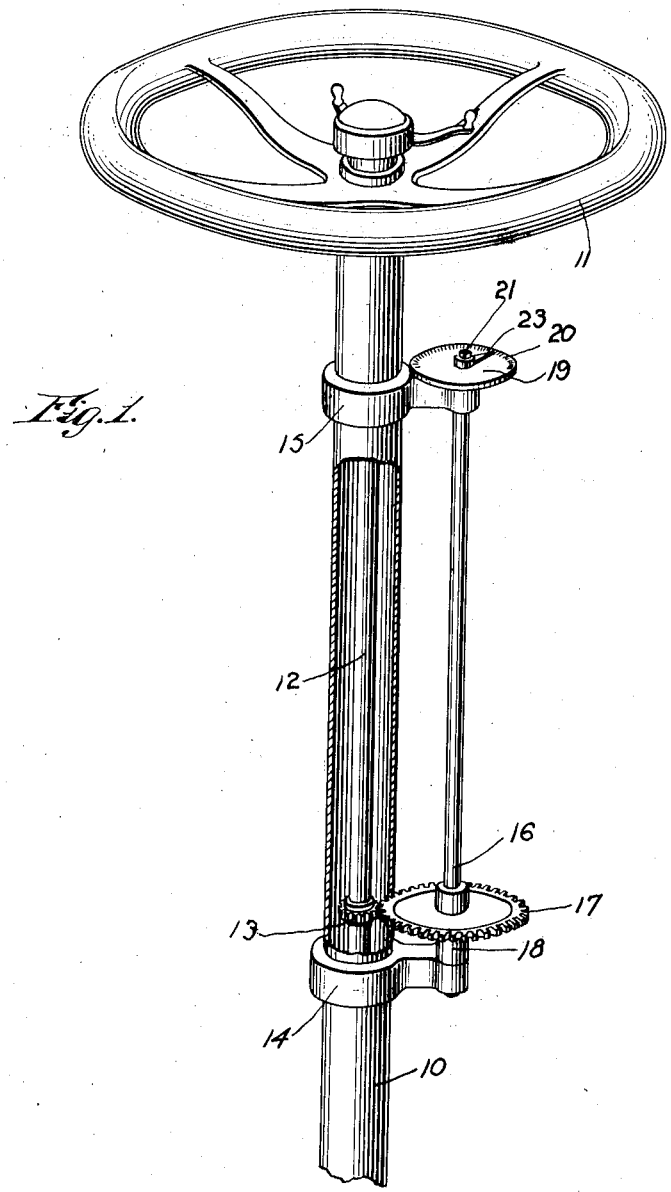
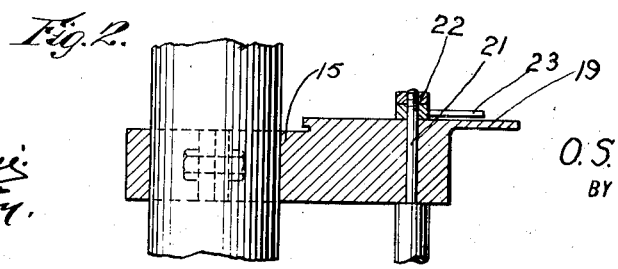
INVENTOR
O. S. PULLIAM

UNITED STATES PATENT OFFICE.

OSWALD S. PULLIAM, OF NEW YORK, N. Y.

STEERING-GEAR ATTACHMENT.

1,328,762.  Specification of Letters Patent.  Patented Jan. 20, 1920.

Application filed April 5, 1919. Serial No. 287,817.

*To all whom it may concern:*

Be it known that I, OSWALD S. PULLIAM, a citizen of the United States, and a resident of the city of New York, borough of Manhattan, in the county and State of New York, have invented a new and Improved Steering-Gear Attachment, of which the following is a full, clear, and exact description.

The present invention relates to attachments for steering axles for motor vehicles, and the like, and has for its primary object to provide means by which the position of the steering wheels of a motor vehicle may be determined by the operator thereof from his position on his seat.

In turning corners in narrow streets, it is of advantage for the driver to know the exact position of the front wheels as it will enable him at all times to make a complete turn without the necessity of backing the car. Furthermore, it is desired that the driver know the position of the front wheels in placing the car alongside a curb, as by so doing, he is able to prevent a rubbing of the tires against the curb and the consequent wear to which the tires are subjected.

Reference is to be had to the accompanying drawings in which—

Figure 1 is a perspective view partly in section of a steering post or column showing the device attached thereto, and Fig. 2 is a detail sectional view.

Referring more particularly to the drawings, the reference character 10 designates the column of the steering gear of a motor vehicle, and 11 designates the hand wheel thereof. This steering column and hand wheel are shown as of conventional form, the specific construction thereof not entering into the present invention. The hand wheel 11 is preferably connected with the steering post 12 which passes through the column 10, and in the present invention, the said steering post 12 is provided with a gear pinion 13, which is rigidly secured thereto and rotates within the column 10, as the post 12 is rotated.

The reference characters 14 and 15 designate brackets which may be secured to the steering column in any desired manner, said brackets being secured to the steering column in spaced relation to each other. The reference character 16 designates a shaft, and carried on the lower end of said shaft, is a gear 17, said gear being spaced from the bracket 14 by means of a collar or the like 18. The bracket 15 is formed with an integral dial 19, and said dial is provided with a plurality of graduations or designating marks 20, arranged about its periphery, as shown in Fig. 1. Carried by the upper end 21 of the shaft 16, and secured thereto, as by means of a nut 22, is a pointer or indicator 23. The pointer or indicator is adapted to move about the dial 19 to register with the several designating characters 20 heretofore mentioned.

The operation of the device is as follows: If the hand wheel 11 is turned to the right, it will be seen that the steering post will likewise be turned, and through the medium of the gears 13 and 17, the shaft 16 will be rotated. Upon rotation of the shaft 16, the pointer 23 will be moved to the various positions relative to the graduations 20 of the disk 19.

By positioning the pointer centrally of the graduations or designating characters 20 of the dial 19, and calling this point "zero", it will be seen that if the wheels are set straight ahead at this point, any movement of the wheels if to the right or to the left, will be indicated on the dial 19 in a position which is easily readable by the operator of the car.

While the construction shown is the preferred form of the invention, it is to be understood that the indicator pointer 23 may be secured directly to the upper end of the steering post 12 and moved therewith about indicating characters carried by a dial, which in turn will be readily secured against rotation to the top of the steering column 10.

Having thus described the invention, what is claimed is:

The combination with the steering column of a motor vehicle, a post extending longitudinally through the column, a gear wheel carried by said post, a pair of spaced brackets carried by said steering column, a shaft rotatably mounted in said spaced brackets, a gear wheel carried by said shaft and projecting through an opening in the steering column into mesh with the gear carried by the steering post, a dial formed integral with one of said brackets, and a pointer carried by the free upper end of said shaft and movable over said dial, said pointer being adapted to be rotated by the steering post to indicate the position of the front wheels relative to the body of the motor vehicle.

OSWALD S. PULLIAM.